US012226849B2

(12) United States Patent
Unger et al.

(10) Patent No.: US 12,226,849 B2
(45) Date of Patent: Feb. 18, 2025

(54) ULTRASONIC TOOL AND ULTRASONIC CONNECTION DEVICE THEREFOR

(71) Applicant: Hesse GmbH, Paderborn (DE)

(72) Inventors: Andreas Unger, Verl (DE); Michael Broekelmann, Delbrueck (DE); Matthias Hunstig, Paderborn (DE); Hans-Juergen Hesse, Paderborn (DE)

(73) Assignee: Hesse GmbH, Paderborn (DE)

( * ) Notice: Subject to any disclaimer, the term of this patent is extended or adjusted under 35 U.S.C. 154(b) by 0 days.

(21) Appl. No.: 17/691,730

(22) Filed: Mar. 10, 2022

(65) Prior Publication Data

US 2022/0193814 A1   Jun. 23, 2022

Related U.S. Application Data

(63) Continuation of application No. PCT/DE2020/100793, filed on Sep. 11, 2020.

(30) Foreign Application Priority Data

Sep. 11, 2019   (DE) .................... 10 2019 124 332.7
Sep. 11, 2019   (DE) .................... 10 2019 124 333.5
(Continued)

(51) Int. Cl.
B23K 20/00   (2006.01)
B06B 1/02    (2006.01)
(Continued)

(52) U.S. Cl.
CPC ............. B23K 20/106 (2013.01); B06B 1/02 (2013.01); B23K 20/004 (2013.01);
(Continued)

(58) Field of Classification Search
CPC .... B23K 20/004; B23K 20/005; B23K 20/10; B23K 2101/40; B23K 2101/32;
(Continued)

(56) References Cited

U.S. PATENT DOCUMENTS 3,690,538 A * 9/1972 Gaiser .................. B23K 20/005
                                                  29/854
4,030,657 A * 6/1977 Scheffer .................. H01L 24/85
                                                  228/110.1
(Continued)

FOREIGN PATENT DOCUMENTS

DE   102017129546 A1   6/2019
DE   102018120822 A1   2/2020
(Continued)

OTHER PUBLICATIONS

JP2005-52983A computer English translation (Year: 2023).*
(Continued)

Primary Examiner — Erin B Saad
(74) Attorney, Agent, or Firm — Muncy, Geissler, Olds & Lowe, P.C.

(57) ABSTRACT

An ultrasonic tool including a first end face and a second end face opposite the first end face. A tool lateral surface connects the first and second end face. The ultrasonic tool is elongate in a longitudinal direction of the tool, wherein at least the first end face is designed as a connection contact surface that is arranged for pressing the ultrasonic tool against a connection component, wherein the ultrasonic tool has an end region having the connection contact surface, which end region extends from the connection contact surface in the longitudinal direction of the tool over 15 mm, but at most one third of a length of the ultrasonic tool, toward the opposite end face, and wherein a pocket-shaped and/or blind-hole-like recess having a recess lateral surface (Continued)

and having a recess floor facing the connection contact surface is formed at the tool lateral surface in the end region.

26 Claims, 17 Drawing Sheets

(30) Foreign Application Priority Data

Sep. 11, 2019 (DE) .................... 10 2019 124 334.3
Sep. 11, 2019 (DE) .................... 10 2019 124 335.1

(51) Int. Cl.
*B23K 20/10* (2006.01)
*B23K 101/38* (2006.01)
*B23K 103/10* (2006.01)
*B23K 103/12* (2006.01)

(52) U.S. Cl.
CPC ...... *B23K 2101/38* (2018.08); *B23K 2103/10* (2018.08); *B23K 2103/12* (2018.08)

(58) Field of Classification Search
CPC ........... H01L 24/78; H01L 2224/85205; H01L 2224/78313
See application file for complete search history.

(56) References Cited

U.S. PATENT DOCUMENTS

| | | | | |
|---|---|---|---|---|
| 4,812,697 A * | 3/1989 | Mishiro | ............... | H02N 2/0045 310/333 |
| 5,194,710 A | 3/1993 | McDaniel et al. | | |
| 5,288,007 A * | 2/1994 | Interrante | ............... | H01L 24/80 228/205 |
| 5,431,324 A * | 7/1995 | Kajiwara | ............... | B23K 20/10 228/103 |
| 5,445,306 A * | 8/1995 | Huddleston | ............. | H01L 24/85 228/1.1 |
| 5,558,270 A * | 9/1996 | Nachon | ................ | B23K 20/005 228/180.5 |
| 7,451,905 B2 * | 11/2008 | Bell | ...................... | B23K 20/004 228/1.1 |
| 7,597,235 B2 * | 10/2009 | Siepe | ...................... | H01L 24/78 228/180.5 |
| 8,028,780 B2 | 10/2011 | Sagawa et al. | | |
| 9,543,267 B2 * | 1/2017 | Zaks | ........................ | H01L 24/78 |
| 11,121,114 B2 * | 9/2021 | Sugiyama | ............... | H01L 24/78 |
| 2005/0279811 A1 * | 12/2005 | Bell | ........................ | H01L 24/78 228/180.5 |
| 2010/0025453 A1 | 2/2010 | Geissler et al. | | |
| 2021/0178515 A1 | 7/2021 | Unger et al. | | |

FOREIGN PATENT DOCUMENTS

| | | |
|---|---|---|
| JP | S6344970 A | 2/1988 |
| JP | H0474445 A | 3/1992 |
| JP | 05109808 A | 4/1993 |
| JP | H0951162 A | 2/1997 |
| JP | 5259220 B2 | 8/2013 |

OTHER PUBLICATIONS

International Search Report dated Jan. 29, 2021 in corresponding application PCT/EP2020/100793.

International Preliminary Report on Patentability dated Mar. 24, 2022 in corresponding appication PCT/EP2020/100793.

* cited by examiner

ULTRASONIC TOOL AND ULTRASONIC CONNECTION DEVICE THEREFOR

This nonprovisional application is a continuation of International Application No. PCT/DE2020/100793, which was filed on Sep. 11, 2020, and which claims priority to German Patent Application No. 10 2019 124 332.7, which was filed in Germany on Sep. 11, 2019, to German Patent Application No. 10 2019 124 333.5, which was filed in Germany on Sep. 11, 2019, to German Patent Application No. 10 2019 124 334.3, which was filed in Germany on Sep. 11, 2019, and to German Patent Application No. 10 2019 124 335.1, which was filed in Germany on Sep. 11, 2019 and which are all herein incorporated by reference.

BACKGROUND OF THE INVENTION

Field of the Invention

The present invention relates to an ultrasonic tool comprising a first end face and a second end face opposite the first end face, as well as a tool lateral surface connecting the first end face and the second end face, wherein the ultrasonic tool is designed to be elongate in a longitudinal direction of the tool, wherein at least the first end face is designed as a connection contact surface that is arranged for pressing the ultrasonic tool against a connection component, and wherein the ultrasonic tool has an end region having the connection contact surface, which end region extends from the connection contact surface in the longitudinal direction of the tool over 15 mm, but at most one third of a length of the ultrasonic tool determined in the longitudinal direction of the tool, toward the opposite end face. In addition, the invention relates to an ultrasonic connection device having an ultrasonic tool, an ultrasonic generator, a transducer, and a laser generator for providing a laser beam.

Description of the Background Art

A generic ultrasonic tool is used in ultrasonic bonding or in ultrasonic welding, for example. The ultrasonic tool is excited into oscillations, for example torsional oscillations, flexural oscillations, or longitudinal oscillations, by the transducer, which has piezoelectric converters, in particular, as oscillators. The oscillators, in turn, are driven by the ultrasonic generator for excitation.

In addition to classic ultrasonic tools, ultrasonic tools for laser-assisted ultrasonic bonding or ultrasonic welding are known. Such tools are described in JP 5259220 A (which corresponds to US 2009/0242291), DE 10 2018 120 822 A1 (which corresponds to US 2021/0178515, which is incorporated herein by reference) and DE 10 2017 129 546 A1, for example. The ultrasonic tools provide for a longitudinal recess extending in the longitudinal direction of the tool, which recess extends from the second end face toward the connection contact surface or opens thereinto. The laser beam provided by means of the laser generator is coupled into the longitudinal recess of the ultrasonic tool and passes through the longitudinal recess to the end region having the connection contact surface or exits the ultrasonic tool at the connection contact surface and strikes the connection component.

However, it is disadvantageous here that coupling the laser beam into the longitudinal recess and also changing the ultrasonic tool can be difficult depending on the design and spatial circumstances. Moreover, vapors may arise or particles may be released when the laser beam strikes the connection component so that contamination occurs at the connection component or its environment.

SUMMARY OF THE INVENTION

It is therefore an object of the present invention to provide an improved ultrasonic tool for laser-assisted ultrasonic bonding and/or welding, as well as an accompanying ultrasonic connection device.

In order to attain the object, the invention is characterized in that a pocket-shaped or blind-hole-like recess having a recess lateral surface and having a recess floor facing the connection contact surface is formed at the tool lateral surface in the end region.

An advantage of the invention is in that the laser beam can be directed onto the ultrasonic tool and the recess from outside owing to the provision of the pocket-shaped or blind-hole-like recess at the tool lateral surface. The positioning of the laser generator or of parts thereof relative to the ultrasonic tool is simplified significantly by this means. Moreover, the recess is provided directly in the end region having the connection contact surface. In this regard, the ultrasonic tool is heated by the laser beam directly where the connection component is placed against the ultrasonic tool.

For the purposes of the invention, the recess provided at the tool lateral surface is pocket-shaped or blind-hole-like when the recess provides for a single opening and this single opening is enclosed solely by the tool lateral surface. In this regard, the recess is not extended into the connection contact surface or the second end face. The connection contact surface is thus closed in design in such a manner that the laser beam does not strike the connection component through the recess or exit at the connection contact surface. An indirect delivery of thermal energy into the connection zone takes place in this case through the heating of the ultrasonic tool in the end region and the flow of heat from the ultrasonic tool to the connection component. Impermissible heating of the connection component, damage to the same, or contamination of the connection point and/or of parts of the laser generator or of the optical components of the laser generator that form and/or guide the laser beam (lens or optical waveguide or the like) can be prevented effectively by this means.

At the same time, the risk that the laser beam is reflected in an uncontrolled manner and, in particular, onto the connection components or in the direction of the operating personnel, is reduced by the provision of the pocket-shaped or blind-hole-like recess. In this way, the risk of damage to the connection components or a hazard to the health of the operating personnel is counteracted. Moreover, it is additionally ensured that the ultrasonic tool can be heated rapidly by the means that the laser beam strikes the ultrasonic tool in the end region adjacent to the connection contact surface and in this respect the energy provided by the laser beam is converted into heat close to the connection point or joint.

The end region of the ultrasonic tool can be defined, on the one hand, by the connection contact surface. On the other hand, the recess is located at least partially, and preferably fully, in the end region, and the end region has a maximum extent of 15 mm in the longitudinal direction of the tool, starting from the connection contact surface, wherein the end region covers at most one third of a length of the ultrasonic tool. In the case of very short ultrasonic tools, which are used in ultrasonic ball bonding, for example, the end region can be shorter than 15 mm. In the case of ultrasonic tools with a length of over 45 mm, the end region is shorter than one third the length of the ultrasonic tool.

The ultrasonic tool can taper in the end region. For example, the ultrasonic tool tapers in a wedge shape. A cross-section defined as being perpendicular to the longitudinal direction of the tool decreases at least by sections in this design. Preferably, the outside dimensions of the ultrasonic tool decrease continuously in the direction of the connection contact surface, as well.

The recess can extend from the tool lateral surface in the direction of the connection contact surface. It is advantageously possible in this way to guide the laser beam even closer to the connection contact surface and to further accelerate the heating or warming of the ultrasonic tool in the end region. Furthermore, the corresponding configuration of the recess produces an advantage in the arrangement or positioning of the laser generator or of its components relative to the ultrasonic tool. The laser beam can namely be directed onto the end region of the ultrasonic tool obliquely from above, in particular.

A bounding contour of the recess—or of its recess lateral surface—formed toward the tool lateral surface is shaped hyperbolically, in the manner of a parabola, in the manner of a circular arc, or elliptically, at least in sections. The circular-arc-like or elliptical shape results, for example, when the recess is made in the shape of a cylinder or a truncated cone. Such a geometry can be manufactured comparatively easily, precisely, and quickly with the result that the ultrasonic tool implemented as a wearing part can be provided economically.

The recess can be designed to be symmetrical, at least in sections, relative to a longitudinal center axis of the same and/or has a cross-sectional contour that is identical, at least in sections, with respect to its size or shape. Advantageously, the manufacturing costs decrease due to the symmetry, the identical size or the identical cross-sectional shape, with the result that the ultrasonic tool can be manufactured economically.

The longitudinal center axis of the recess and the longitudinal direction of the tool can enclose an acute angle. Preferably, the acute angle is in the range from 15 to 50°. Advantageously, the delivery of the laser beam is simplified by this means. In particular, the laser beam can be directed onto the end region of the ultrasonic tool obliquely from above. The arrangement of the laser generator or the integration of individual parts of the laser generator into a movable positioning head of an ultrasonic connection device is structurally simplified in this way. In particular, lenses or optical waveguides for forming and guiding the laser beam can be provided on the positioning head and moved with it, while other components of the laser generator (for example a laser source) are installed in a stationary position.

The recess floor and/or the recess lateral surface of the recess can have a surface that diffusely reflects the laser beam. Advantageously, the diffusely reflective surface prevents a specular reflection of the laser beam with the result that retroreflection of the laser beam in the direction of the laser source and/or damage to components is counteracted. Moreover, the radiance or intensity decreases due to the diffuse reflection in different directions; this is an advantage since surfaces can change or be damaged above a material-dependent, surface-dependent, or wavelength-dependent radiant flux density (laser surface power density). On the one hand, such changes have an effect on the absorption properties, and thus ultimately on the thermal behavior of the ultrasonic tool under laser irradiation. On the other hand, vapors arise or particles are released when the beam intensity is too high, with the result that these can be deposited in unfavorable locations and/or interfere with the laser beam.

The recess floor can be oriented perpendicularly to the longitudinal center axis of the recess. Manufacture of the recess is advantageously simplified by this means. For example, the recess oriented obliquely to the longitudinal direction of the tool as a cylinder or truncated cone can have a surface oriented perpendicularly to the recess lateral surface in the region of the recess floor.

The surface at the recess floor can be oriented with a slope to the longitudinal center axis of the recess in such a manner that a laser beam incident on the recess floor in the recess is reflected in the direction of the recess lateral surface. Advantageously, the absorptive capacity improves as a result, since a reflected portion of the laser beam strikes a bounding face of the recess anew after striking the recess floor. In addition, outward reflection of the laser beam is counteracted.

A rounding can be formed as a transition surface between the recess lateral surface and the recess floor. Manufacture of the recess is advantageously simplified by the provision of the rounded transition surface. Moreover, the rounded transition surface promotes the non-specular reflection of the laser beam.

The recess can be oriented symmetrically to a longitudinal center plane of the tool incorporating the longitudinal direction of the tool. Especially advantageously, the longitudinal center plane of the tool is implemented as a plane of symmetry of the ultrasonic tool. Manufacture of the ultrasonic tool, as well as installation of the same in the ultrasonic connection device, is advantageously simplified by the symmetry.

The ultrasonic tool can be designed symmetrically relative to a transverse center plane oriented perpendicularly to the longitudinal direction of the tool. In this case the second end face of the ultrasonic tool, in addition to the first end face, is also designed as a connection contact surface. Advantageously, the ultrasonic tool can be realized as a reversible tool owing to the symmetry of the transverse center plane. The service life of the ultrasonic tool is increased by this means.

If the ultrasonic tool is designed as a reversible tool, it provides for two end regions at mutually opposite end faces, each with at least one pocket-like or blind-hole-like recess and a connection contact surface. The symmetrical form of the ultrasonic tool to the transverse center plane ensures here that a realignment of the laser relative to the ultrasonic tool is not necessary after reversal of the ultrasonic tool. All that is required after reversal is to fix the ultrasonic tool in the defined installation position on the positioning head.

The recess of the ultrasonic tool can be produced by electric discharge machining, by an additive manufacturing process, by laser structuring or laser ablation, by primary forming methods, and in particular in a sintering process or by machining.

A profiling with which the ultrasonic tool can be pressed against the connection component is provided on the at least one connection contact surface. In particular, a contact contour for the connection component can be provided on the connection contact surface of the ultrasonic tool. For example, a V-shaped transverse recess for a bond wire made of aluminum or copper or a pad structure and/or honeycomb structure for ultrasonic bonding or ultrasonic welding of flat parts such as aluminum strip material or lead frames of sheet copper can be provided as contact contour. Due to the provision of the profiling or contact contour, the flatness of the connection contact surface is interrupted, at least locally, and a frictional and/or interlocking fixing of the connection component on the ultrasonic tool can be achieved.

The ultrasonic tool, at least in the end region, can be composed of a tungsten-carbide-based or titanium-carbide-based hard metal, of a ceramic, of steel, and/or preferably of tungsten carbide in a cobalt matrix or boron nitride.

In an example, an ultrasonic connection device for ultrasonic welding and/or ultrasonic bonding comprises an ultrasonic tool according to the invention with a recess formed at the tool lateral surface, an ultrasonic generator and a transducer, wherein the ultrasonic generator excites the transducer into oscillations in such a manner and the transducer interacts with the ultrasonic tool in such a manner that the ultrasonic tool is excited into ultrasonic oscillations, and preferably into ultrasonic flexural oscillations, a laser generator for providing a laser beam, wherein the laser beam is directed onto the recess formed at the ultrasonic tool in such a way that the laser beam preferably strikes the ultrasonic tool entirely or mainly inside the recess and in such a way that the laser beam especially preferably strikes the recess floor of the recess facing the connection contact surface of the ultrasonic tool.

An advantage of the invention includes that laser-assisted ultrasonic bonding or ultrasonic welding can be carried out effectively and safely at the same time by means of the ultrasonic connection device according to the invention. Because of the provision of the recess in the end region of the ultrasonic tool, on the one hand energy can be introduced into the vicinity of the connection contact surface in a very targeted manner with the result that the ultrasonic tool can be heated rapidly. Moreover, the recess effectively counteracts a non-specular reflection of the laser beam, and consequently damage to the connection components.

An axis of incidence of the laser beam can be oriented with a slope to the longitudinal center axis of the recess. By means of the inclined incidence of the laser beam in the recess, the risk of a specular reflection of the laser beam, for example at the recess floor, is advantageously counteracted in a simple manner and very effectively at the same time, with the result that the laser beam is reflected diffusely, in particular, and consequently multiple times in the recess, and that the absorptive capacity is improved in this way. Nevertheless, the recess can provide for a recess floor oriented perpendicularly to the recess lateral surface and/or the longitudinal center axis so that the recess can have a simple geometry that is economical to manufacture. Moreover, damage to an optical component of the laser generator can be counteracted. In addition, a large free space is formed because of the inclined incidence of the laser beam in the recess at the tool tip so that a collision with parts of the connection component is counteracted or a flexibility in moving the positioning head is improved.

The laser beam can strike the recess floor at an angle differing from 90°. Advantageously, a specular reflection of the laser beam, in particular in the direction of the axis of incidence of the laser beam, is counteracted by this means.

A wavelength of the laser beam can be matched to a material of the ultrasonic tool, or its geometry and surface finish, in the region of the recess such that an absorptance of at least 0.3, and preferably of 0.5 or greater, is achieved. It is advantageously possible in this way to ensure that the ultrasonic tool can be heated very effectively by means of the laser beam. Furthermore, the heating improves with every reflection when the reflected part of the laser beam strikes the ultrasonic tool again inside the recess, and consequently an additional part of the laser beam is absorbed.

The ultrasonic connection device can have a measuring device equipped for contactless temperature measurement, wherein the measuring device is associated with the ultrasonic tool such that the temperature measurement is accomplished in the end region of the ultrasonic tool and preferably in the recess. For example, the temperature measurement can be accomplished by means of pyrometry. In particular, the contactless temperature measurement can be carried out in the recess at a diffusely reflective surface.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
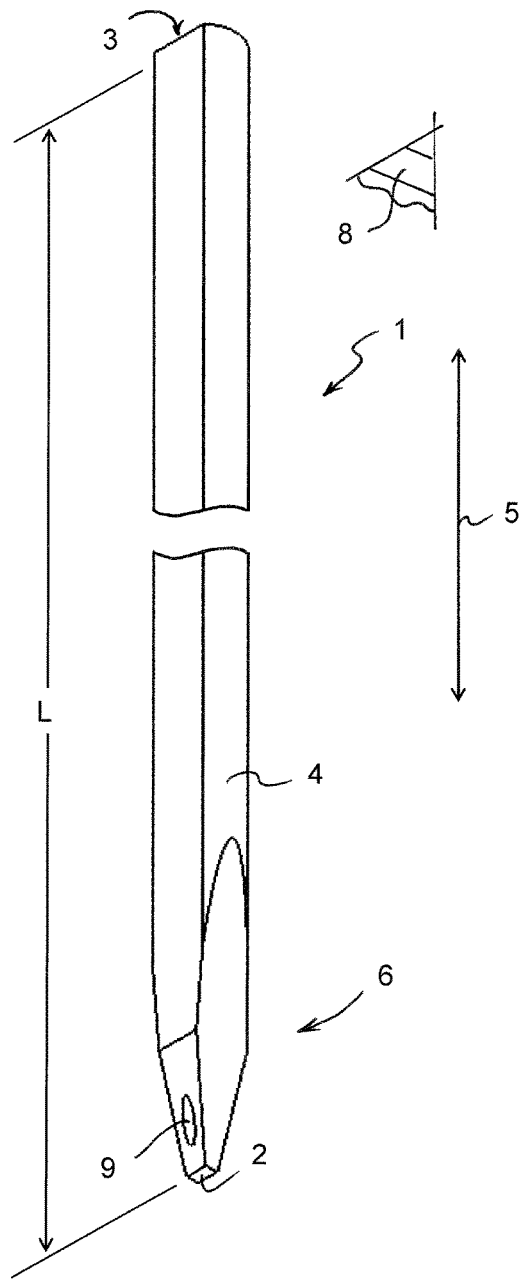
FIG. 1 is a perspective view of a first embodiment of an ultrasonic tool designed to be elongate in a longitudinal direction of the tool, having a pocket-like or blind-hole-like recess in an end region of the same.
Figure 2:
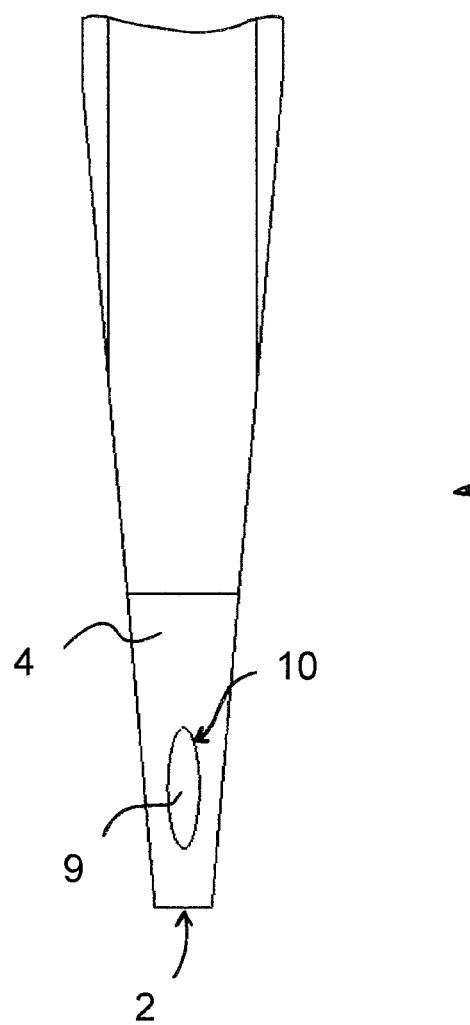
FIG. 2 is an enlarged front view of the end region of the ultrasonic tool from FIG. 1 with the recess.
Figure 3:
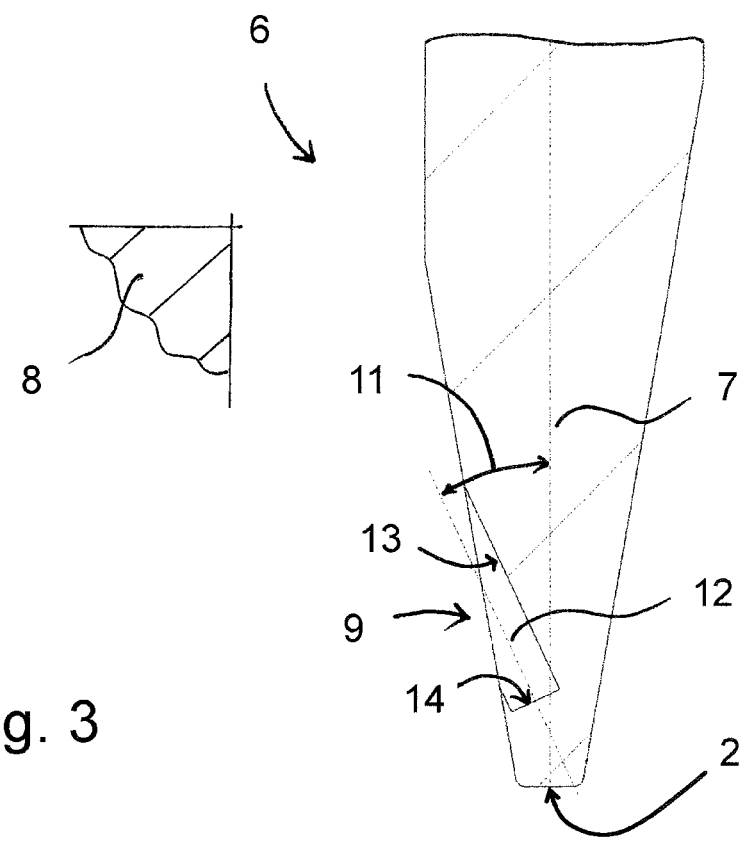
FIG. 3 is a sectional side view of the end region of the ultrasonic tool from FIGS. 1 and 2.

FIGS. 1 to 3 show a first embodiment of an ultrasonic tool 1 according to the invention, which includes a first end face 2 designed as a connection contact surface, a second connection side 3 opposite the connection contact surface 2, and a tool lateral surface 4 connecting the end faces 2, 3. The ultrasonic tool 1 is designed to be elongate in a longitudinal direction 5 of the tool.

The connection contact surface 2 is arranged for pressing a connection component that is not shown against the ultrasonic tool 1. In the present case, the connection contact surface 2 is even or flat, and is implemented without a contact contour. The ultrasonic tool 1 serves in this regard for, e.g., ultrasonic bonding or ultrasonic welding of flat parts, in particular aluminum strip material or lead frames made of copper sheets.

The ultrasonic tool 1 is designed to be long in the longitudinal direction 5 of the tool. It has a length L from the first end face 2 to the second end face 3 that is greater than 50 mm. Relative to the longitudinal direction 5 of the tool, the lower 15 mm of the ultrasonic tool 1 with the connection contact surface 2 form an end region 6 of the ultrasonic tool 1. In the end region 6, the ultrasonic tool 1 tapers relative to a cross-section oriented perpendicularly to the longitudinal direction 5 of the tool toward the connection contact surface 2. Relative to the external contour, the ultrasonic tool 1 in the end region 6 runs in a wedge shape to the connection contact surface 2. The connection contact surface 2 is essentially perpendicular to the longitudinal direction 5 of the tool or a longitudinal center axis 7 of the tool oriented in the longitudinal direction 5 of the tool. In addition, the ultrasonic tool 1 is designed to be symmetrical relative to a longitudinal center plane 8 incorporating the longitudinal center axis 7 of the tool.

The ultrasonic tool 1 provides for a recess 9 in the end region 6. The recess 9 has an elliptically-shaped bounding contour 10 to the tool lateral surface 4, opening solely into the tool lateral surface 4.

The recess 9 is designed in the manner of a blind hole or pocket. Relative to a longitudinal center axis 12 of the recess 9 inclined at an acute angle 11 to the longitudinal center axis 7 of the tool, the recess 9 has a circular cross-sectional contour of constant size. The recess 9 in this regard has a cylindrical recess lateral surface 13 as well as a flat recess floor 14 oriented perpendicularly to the longitudinal center axis 12 of the recess 9. The recess floor 14 faces the connection contact surface 2.

Figure 4:
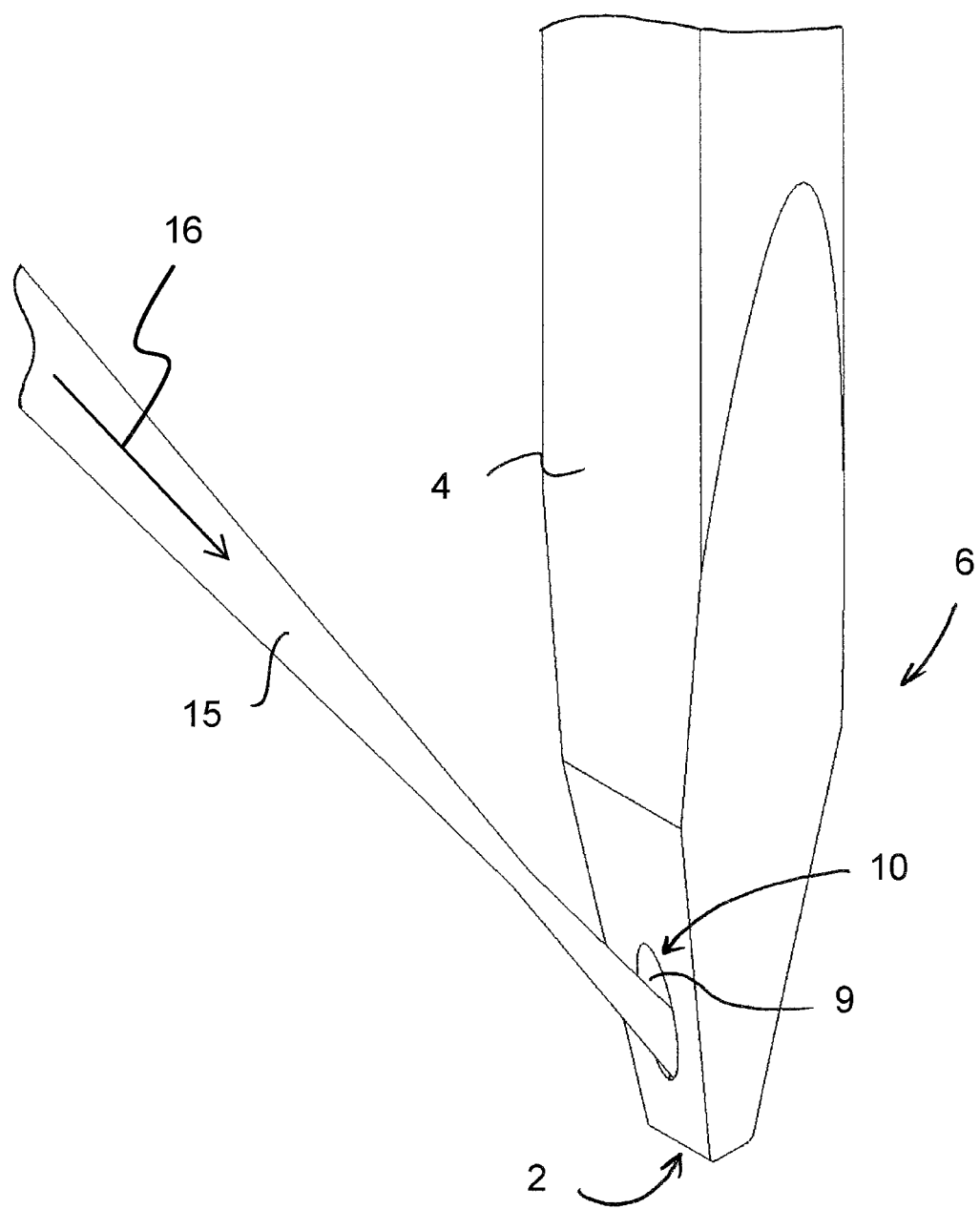
FIG. 4 is a perspective representation of the end region of the ultrasonic tool from FIGS. 1 to 3 with a divergent laser beam directed onto the recess.

FIG. 4 shows a perspective view of the end region 6 and a laser beam 15 directed onto the recess 9. The laser beam 15 is implemented as a divergently formed laser beam 15 with a focal point or focus that is located in front of the ultrasonic tool 1 with reference to a direction of incidence 16 of the laser beam 15 and outside the recess 9. An axis 17 of incidence of the laser beam 15 in this case is oriented with a slope to the longitudinal center axis 12 of the recess 9, see FIG. 5. The laser beam 15 in this regard strikes the recess floor 14 at an oblique angle, which is to say differing from 90°. A reflected, which is to say not absorbed, part of the laser beam 15 is reflected by the recess floor 14 in the direction of the recess lateral surface 13, where it is again absorbed or reflected further.

Figure 5:
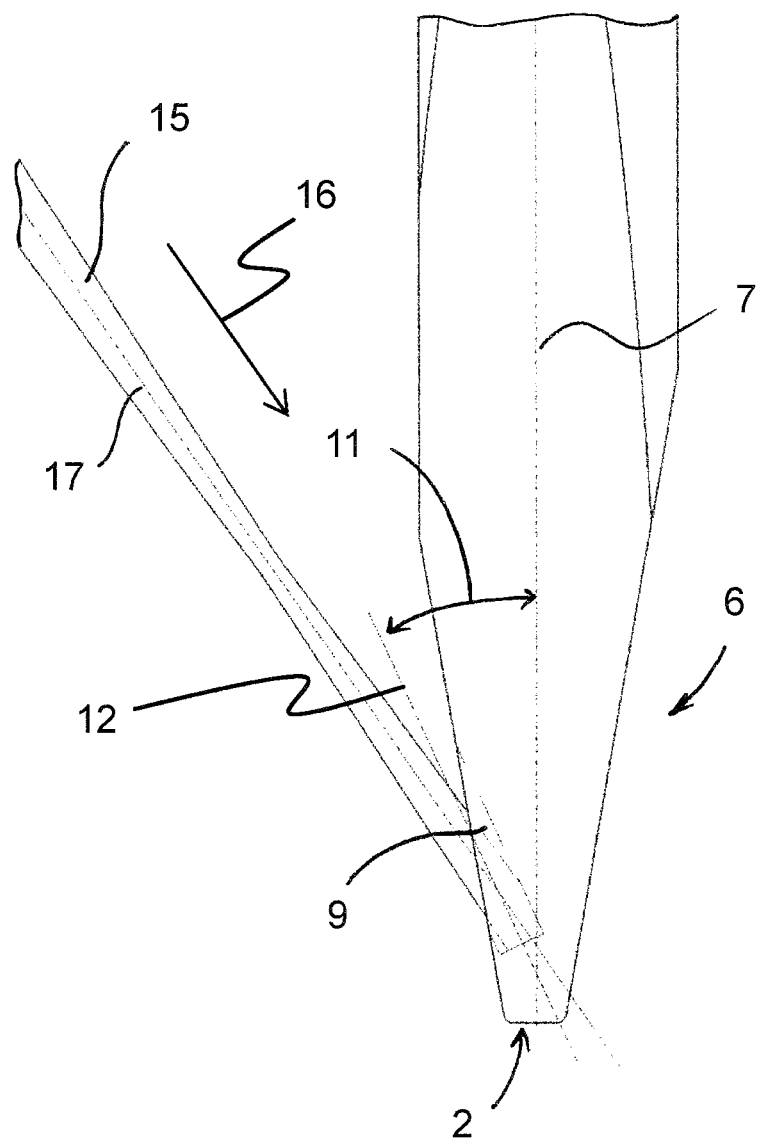
FIG. 5 is a side view of the end region of the ultrasonic tool and of the laser beam directed onto the recess (FIG. 4)
Figure 6:
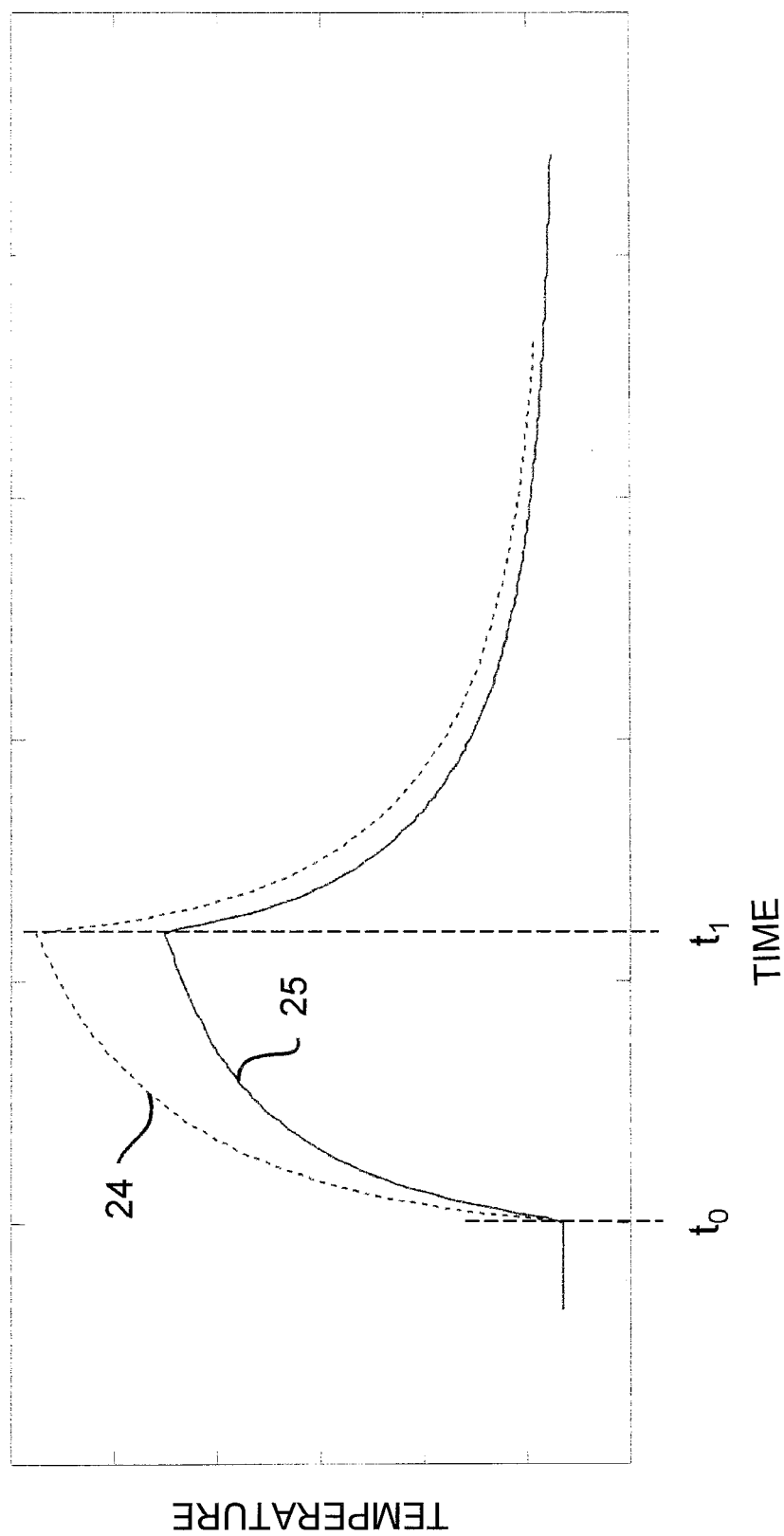
FIG. 6 is a comparison of heating curves for the ultrasonic tool from FIGS. 1 to 5 and a conventional ultrasonic tool with no recess.

In FIG. 6, a temperature of the ultrasonic tool 1 shown in FIGS. 1 to 5 in the connection contact surface 2 is represented by the dashed graph 24. Compared with this in the graph 25, shown with a solid line, is the temperature curve of an ultrasonic tool with no recess, which otherwise has identical dimensions and is produced from an identical material. Both ultrasonic tools are irradiated with a laser beam of identical wavelength, identical focusing and positioning, and identical, constant power.

The laser beam 15 is switched on at the time $t_0$ and is switched off at the time $t_1$. Starting from an ambient temperature, the two ultrasonic tools heat as a result of the laser beam 15. The ultrasonic tool 1 according to the invention is heated faster and to a higher temperature than the reference tool, however. It is proven in this regard that the ultrasonic tool 1 according to the invention absorbs more power, or less power is lost through reflection of the laser beam 15.

Figure 7:
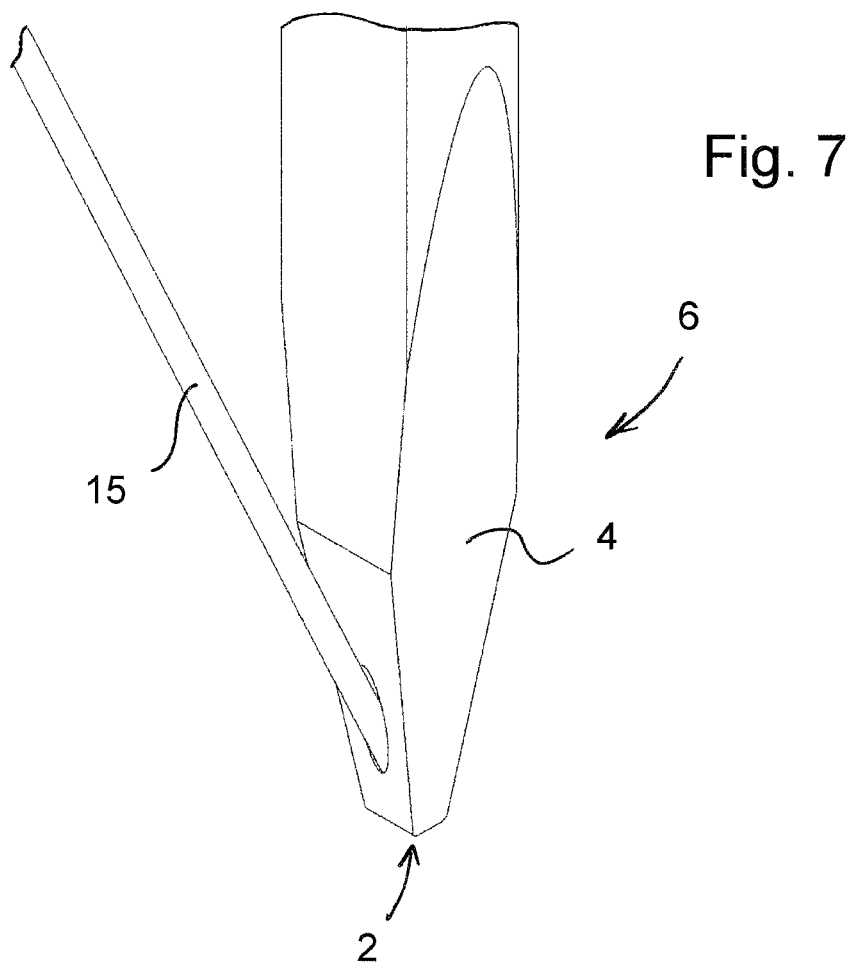
FIG. 7 is a perspective view of the end region of the ultrasonic tool from FIGS. 1 to 5 with a collimated laser beam directed onto the recess.
Figure 8:
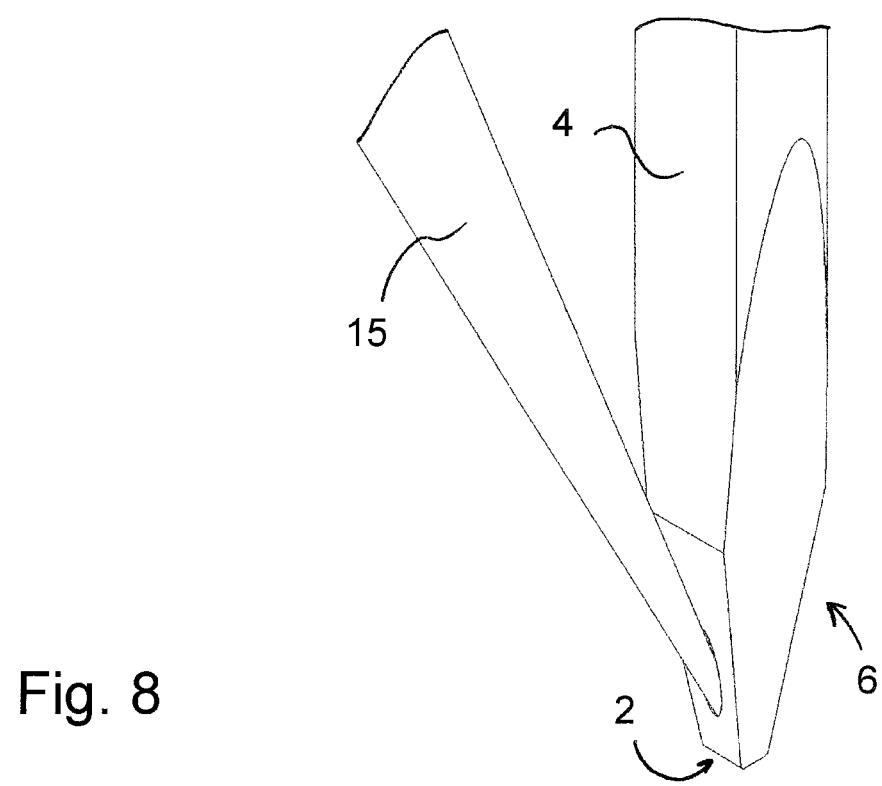
FIG. 8 is a perspective view of the end region of the ultrasonic tool from FIGS. 1 to 5 with a focused laser beam directed onto the recess.

Insofar as the laser beam 15 is divergent in FIGS. 4 and 5, this is solely by way of example. In FIG. 7, the ultrasonic tool 1 from FIGS. 1 to 3 is irradiated with a collimated laser beam 15. In FIG. 8, the laser beam 15 is convergent in form.

Figure 10:
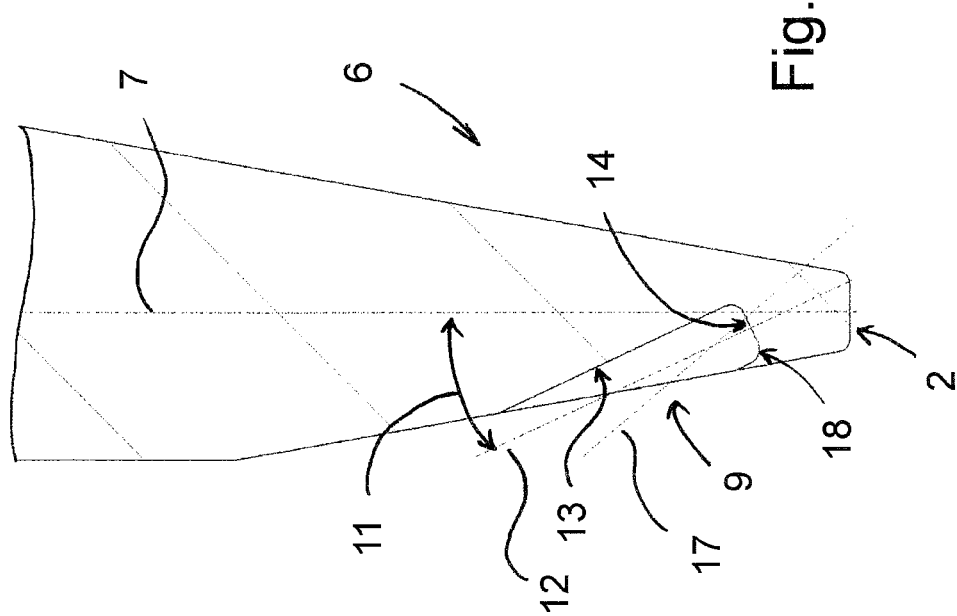
FIG. 10 is the sectional representation from FIG. 9, wherein an axis of incidence of the laser beam is additionally depicted.
Figure 9:
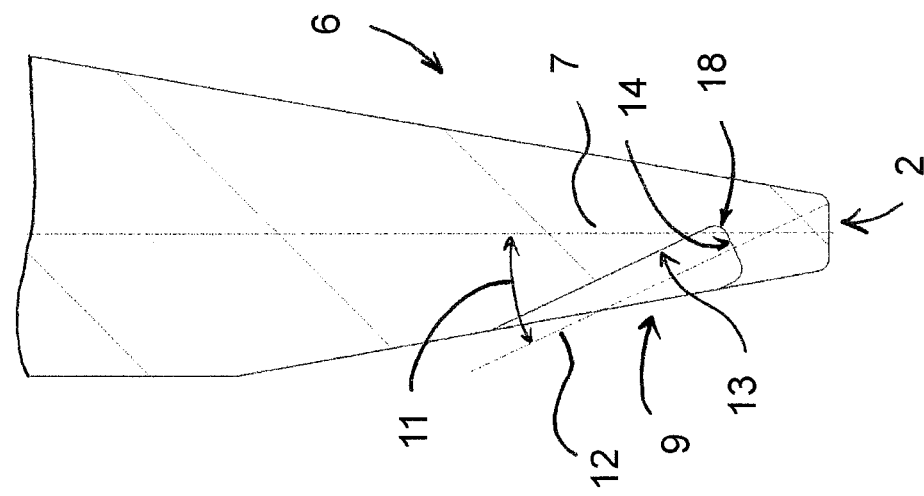
FIG. 9 is a sectional representation of the end region of the ultrasonic tool from FIGS. 1 to 5 with a representation of a longitudinal center axis of the tool oriented in the longitudinal direction of the tool and of a longitudinal center axis of the recess.

FIG. 9 shows a sectional representation of the end region 6 of the ultrasonic tool 1 from FIGS. 1 to 3 with the recess 9. It is clear from the enlarged representation here that a rounded transition surface 18 is formed between the recess lateral surface 13 and the recess floor 14. The comparison FIG. 10 additionally shows the axis 17 of incidence of the laser beam 15 with a slope to the longitudinal center axis 12.

Figure 11:
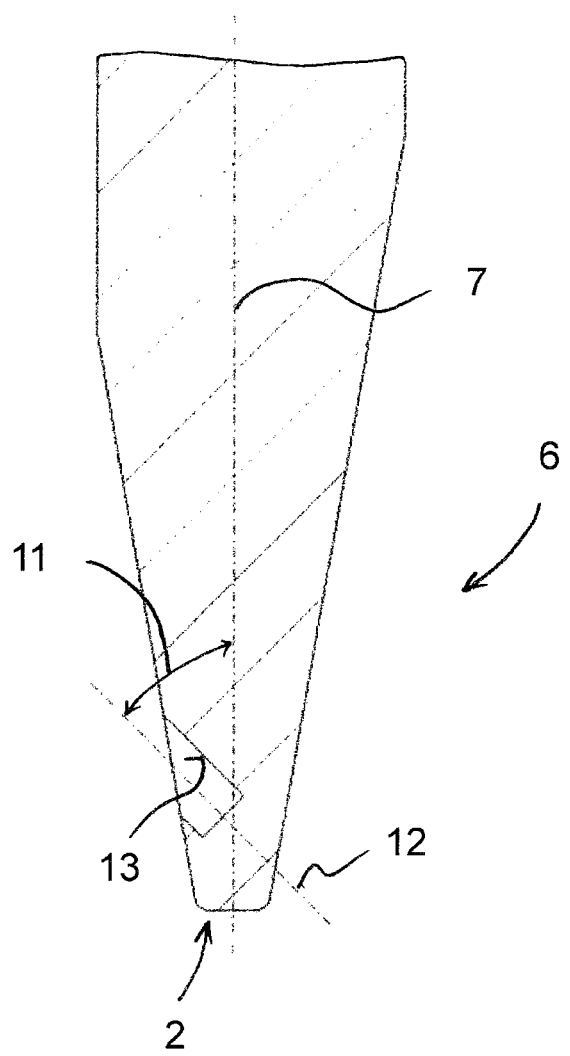
FIG. 11 is a sectional representation of the end region of a second embodiment of the ultrasonic tool with a cylindrical recess that is more strongly sloped toward the longitudinal center axis of the tool.

A second embodiment of the ultrasonic tool 1 from FIG. 11 provides for a recess 9 that is more strongly sloped with respect to the acute angle 11. The recess 9 is, once again, equipped with a cylindrical recess lateral surface 13 and a flat recess floor 14 oriented perpendicularly to the longitudinal center axis 12 of the recess 9. The implementation of a transition surface 18 between the recess lateral surface 13 and the recess floor 14 is dispensed with in the present case.

Figure 12:
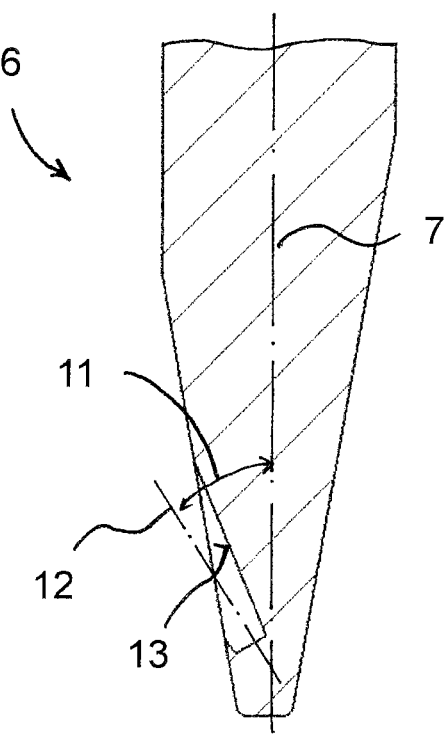
FIG. 12 is a sectional representation of the end region of a third embodiment of the ultrasonic tool with a recess in the shape of a truncated cone.

According to a third embodiment of the ultrasonic tool 1 in accordance with FIG. 12, the recess lateral surface 13 of the recess 9 is formed in the shape of a truncated cone, wherein the recess 9 tapers in the direction of the recess floor 14.

Figure 13:
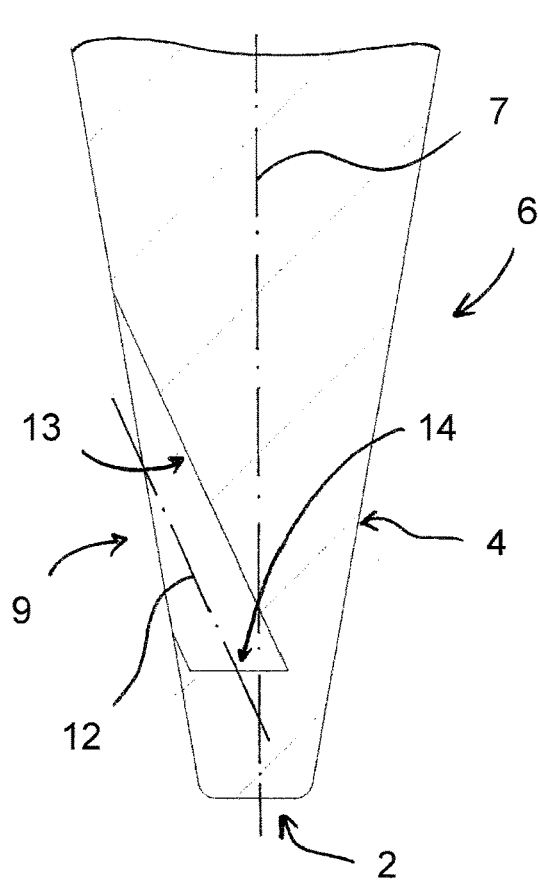
FIG. 13 is a sectional representation of the end region of a fourth embodiment of the ultrasonic tool with a recess whose recess floor is oriented perpendicularly to the longitudinal center axis of the tool.
Figure 14:
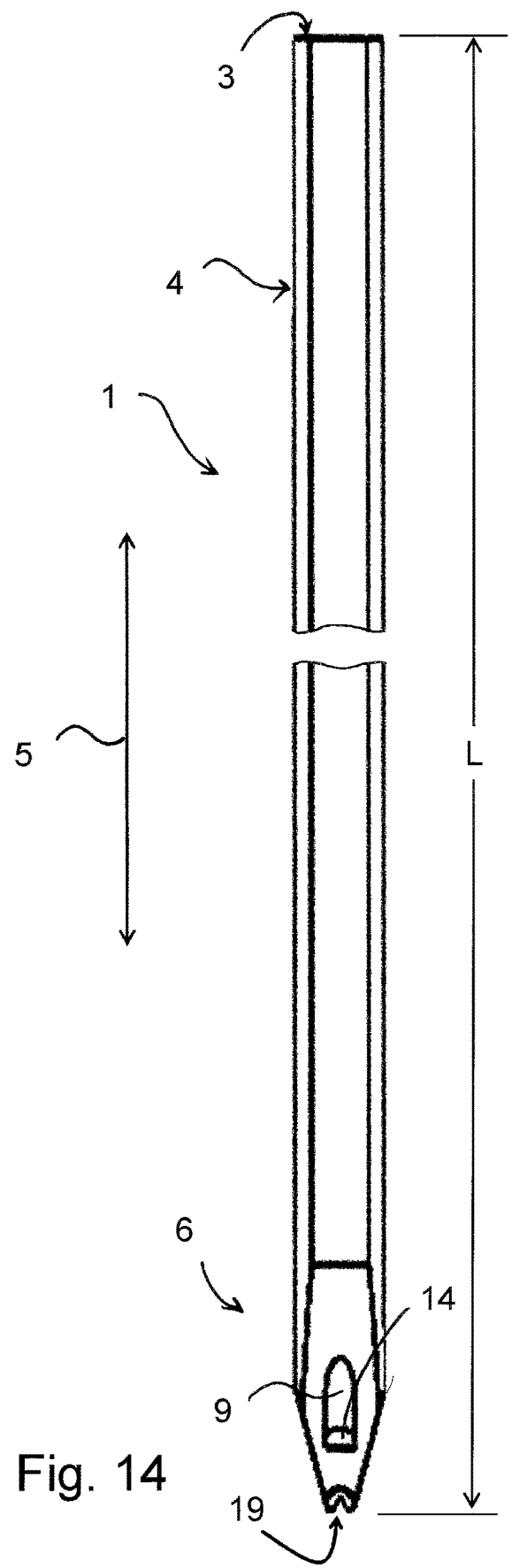
FIG. 14 is a front view of the ultrasonic tool in a fifth embodiment.
Figure 15:
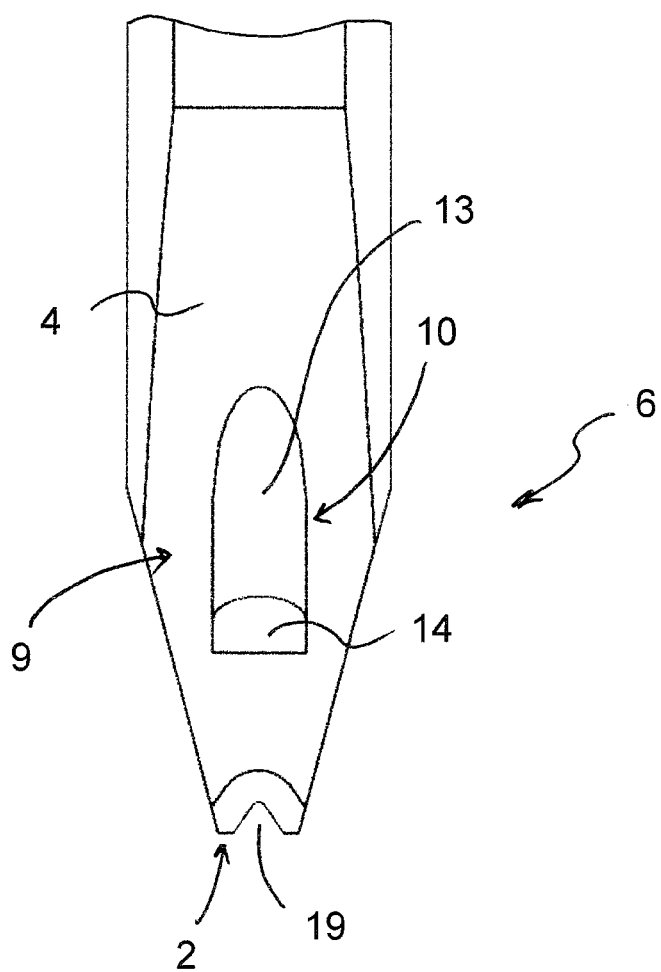
FIG. 15 is an enlarged representation of the end region of the ultrasonic tool from FIG. 14.
Figure 16:
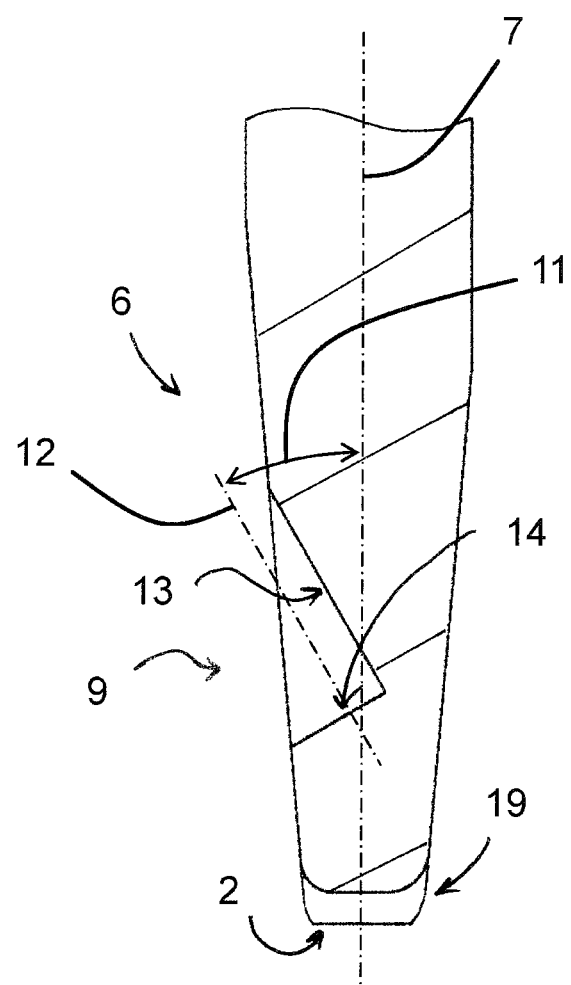
FIG. 16 is a sectional representation of the end region of the ultrasonic tool from FIGS. 14 and 15.
Figure 17:
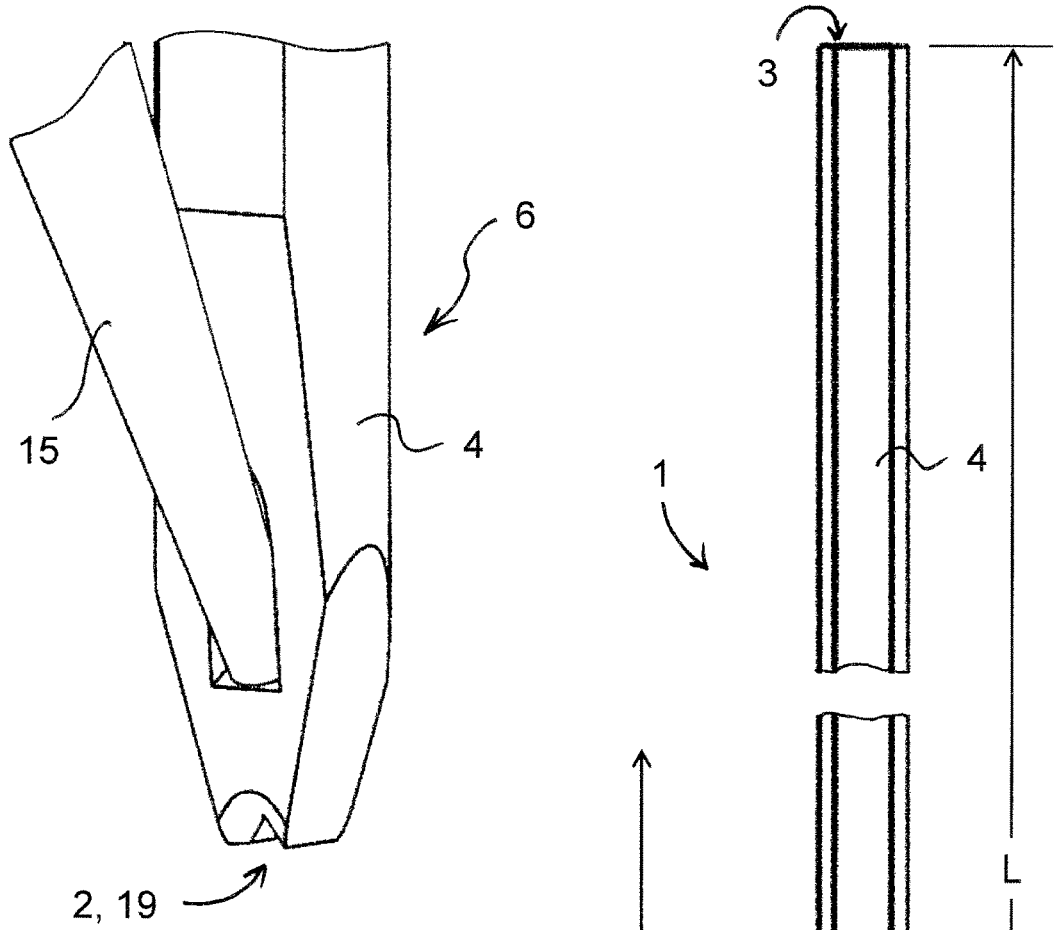
FIG. 17 is a perspective view of the end region of the ultrasonic tool from FIGS. 14 to 16 with a laser beam incident in the recess.
Figure 18:
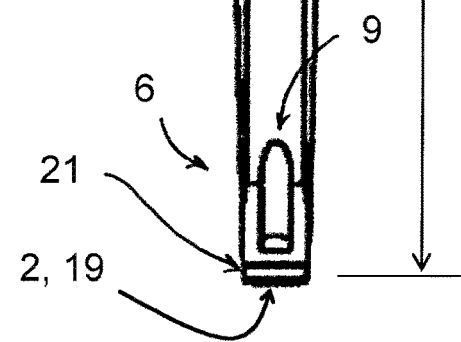
FIG. 18 is a front view of the ultrasonic tool in a sixth embodiment.
Figure 19:
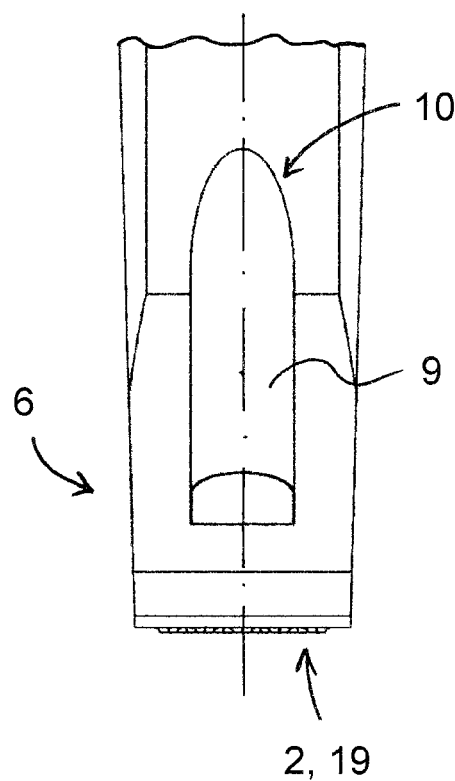
FIG. 19 is an enlarged representation of the end region of the ultrasonic tool from FIG. 18.
Figure 20:
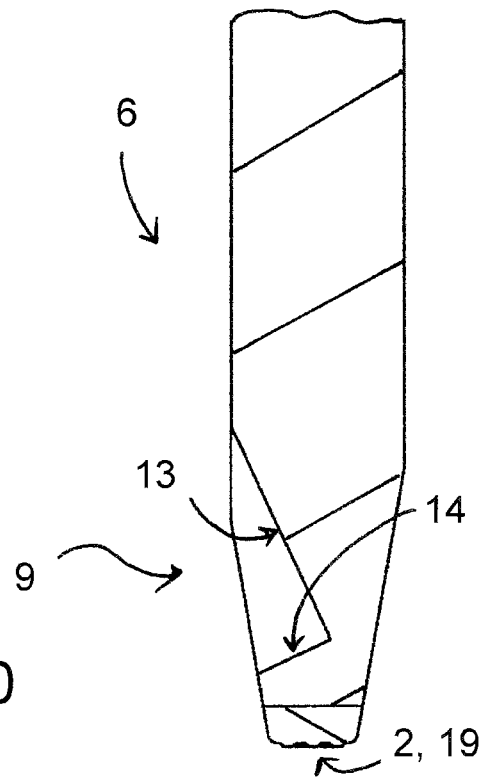
FIG. 20 is a sectional representation of the end region of the ultrasonic tool from FIGS. 18 and 19.

According to a fourth embodiment, the ultrasonic tool 1 in accordance with FIG. 13 provides for a recess 9 with a cylindrical recess lateral surface 13 and a flat recess floor 14. However, the recess floor 14 is parallel to the connection contact surface 2 or perpendicular to the longitudinal center axis 7 of the tool and accordingly oriented with a slope to the longitudinal center axis 12 of the recess 9.

According to a fifth embodiment of the invention in accordance with FIGS. 14 to 17, the ultrasonic tool 1 provides for a connection contact side 2 [sic; probably should say "connection contact surface 2"] with a V-shaped contact contour 19. The contact contour 19 extends transversely to the longitudinal direction 5 of the tool in the longitudinal center plane 8 of the ultrasonic tool 1. The V-shaped receiving contour 19 [sic; for the sake of consistency, probably should say "contact contour 19"] serves, in particular, to receive a bond wire during ultrasonic wire bonding.

The recess 9, which the ultrasonic tool 1 provides for in the end region 6, is designed in the manner of a pocket to the effect that the recess floor 14 extends to the tool lateral surface 4. The bounding contour 10 of the recess 9 is defined in this regard by the recess lateral surface 13, which is semicylindrical in sections and flat in sections, as well as by the recess floor 14. Relative to a longitudinal center axis 12 of the recess 9, which takes into account the semicylindrical region of the recess lateral surface 13, the recess 9 is oriented at the acute angle 11 to the longitudinal center axis 7 of the tool.

The laser beam 15 strikes the ultrasonic tool 1 entirely or mainly in the region of the recess floor 14. In particular, provision can be made that the axis 17 of incidence of the laser beam 15 is oriented with a slope to the longitudinal center axis 12 of the recess or obliquely to the recess floor 14.

According to a sixth embodiment of the invention in accordance with FIGS. 18 to 21, the ultrasonic tool 1 is designed in two parts. In the end region 6, the ultrasonic tool 1 provides, once again, for the recess 9, which corresponds to the recess 9 of the ultrasonic tool 1 according to the fifth exemplary embodiment of the invention with respect to its geometry. Once again, the recess floor 14 faces the connection contact surface 2 of the ultrasonic tool 1.

The connection contact surface 2 is provided with a pad-like contact contour 19. While the recess 9 is formed in the end region 6 on a shank of the ultrasonic tool 1 that is elongated in the longitudinal direction 5 of the tool, the connection contact surface 2 with the pad-like contact contour 19 is formed by a contact pad 21 that is attached to the shank 20 and is bonded or hard-soldered or mechanically joined thereto.

Figure 21:
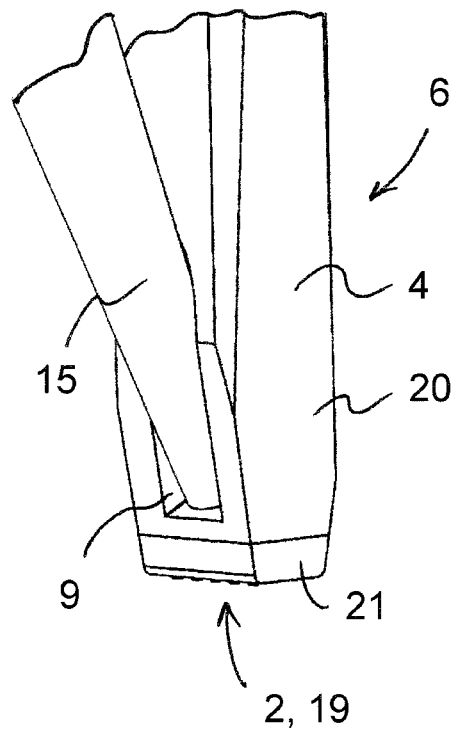
FIG. 21 is a perspective representation of the end region of the ultrasonic tool from FIGS. 18 to 20 with the laser beam impinging in the recess.

FIG. 21 shows how the convergently formed laser beam 15 enters the recess 9 of the ultrasonic tool 1 and preferably strikes the recess floor 14 in the recess 9.

FIGS. 22 to 25 show a seventh, an eighth, a ninth, and a tenth embodiment of the ultrasonic tool 1 according to the invention. The ultrasonic tools 1 in accordance with FIGS. 22 to 25 differ in particular with respect to the geometry or configuration of the recess floor 14 of the recess 9.

Figure 22:
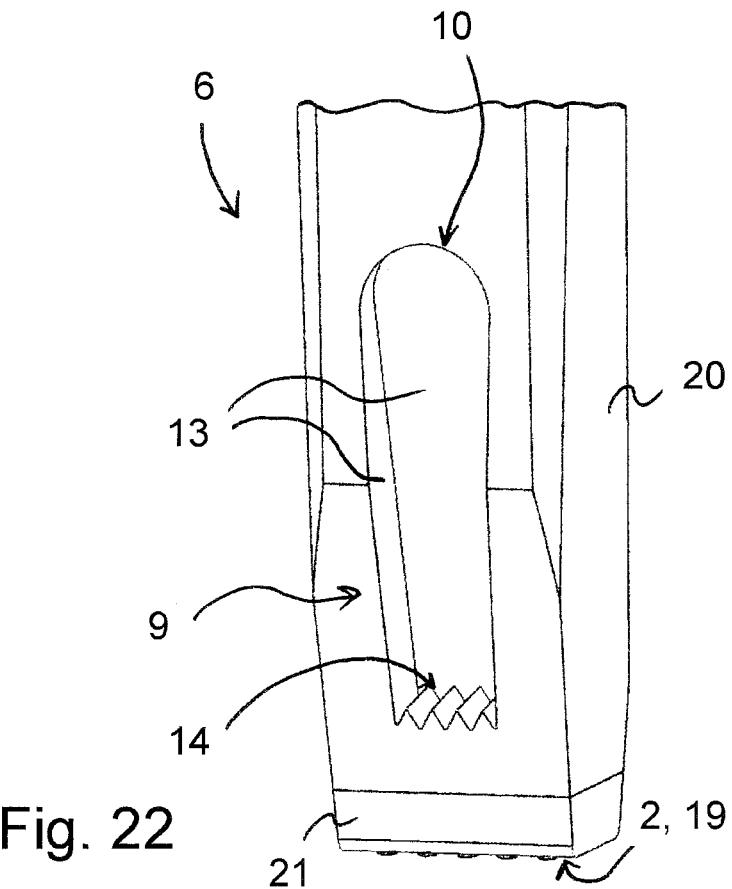
FIG. 22 is a perspective representation of the end region of the ultrasonic tool in a seventh embodiment.
Figure 23:
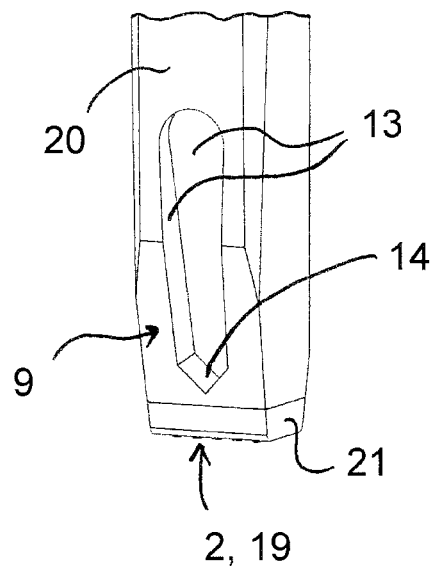
FIG. 23 is a perspective representation of the end region of the ultrasonic tool in an eighth embodiment.
Figure 24:
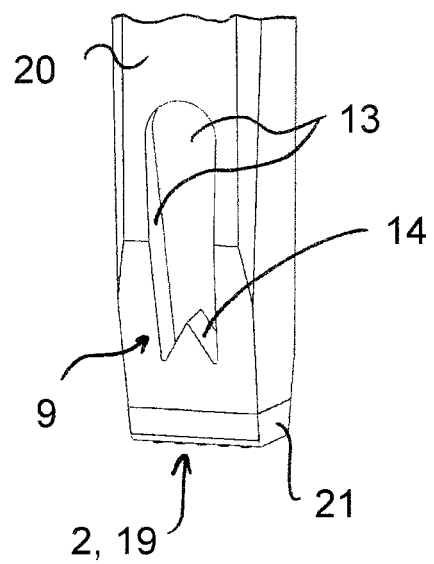
FIG. 24 is a perspective representation of the end region of the ultrasonic tool in a ninth embodiment.
Figure 25:
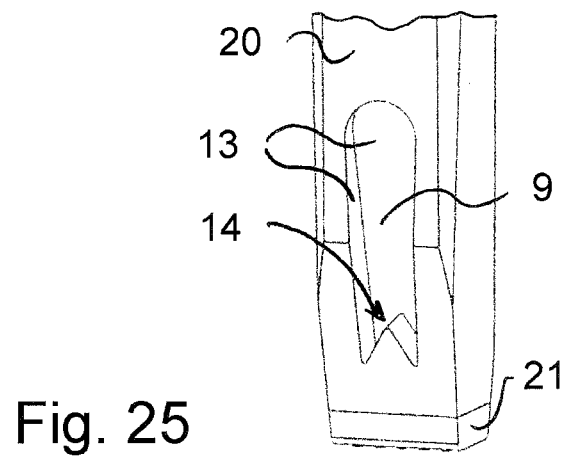
FIG. 25 is a perspective representation of the end region of the ultrasonic tool in a tenth embodiment.

In FIG. 22, the seventh exemplary embodiment of the invention is realized with a recess floor 14 having multiple serrations. According to an eighth embodiment of the invention in accordance with FIG. 23, the ultrasonic tool provides for a recess 9 that has a recess floor 14 that narrows in a wedge shape or tapers in a funnel shape in the direction of the connection contact surface 2. According to FIGS. 24 and 25, the recess floor 14 has a single serration. The serrations are each oriented such that a laser beam 15 striking the recess floor 14 in the region of the flanks of the serrations is deflected laterally in the direction of the recess lateral surface 13. The recess 9 according to the ninth exemplary embodiment of the invention (FIG. 24) and the tenth exemplary embodiment of the invention (FIG. 25) differ in that the tip of the recess floor in FIG. 24 is sharp-edged, whereas it is chamfered or rounded in FIG. 25.

Figure 26:
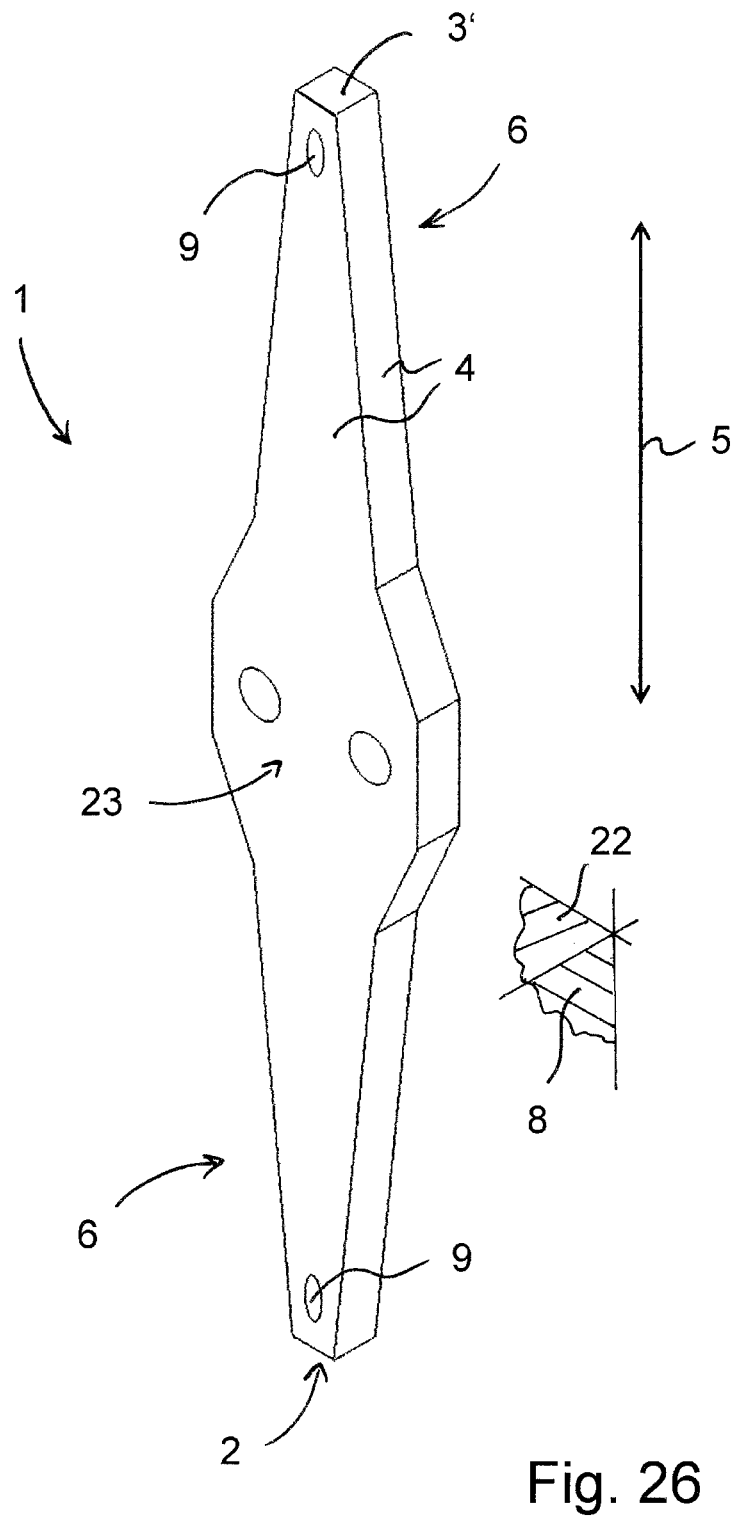
FIG. 26 is a perspective representation of an eleventh embodiment of the ultrasonic tool, wherein the ultrasonic tool is designed symmetrically relative to a transverse center plane oriented perpendicularly to the longitudinal direction of the tool.
Figure 27:
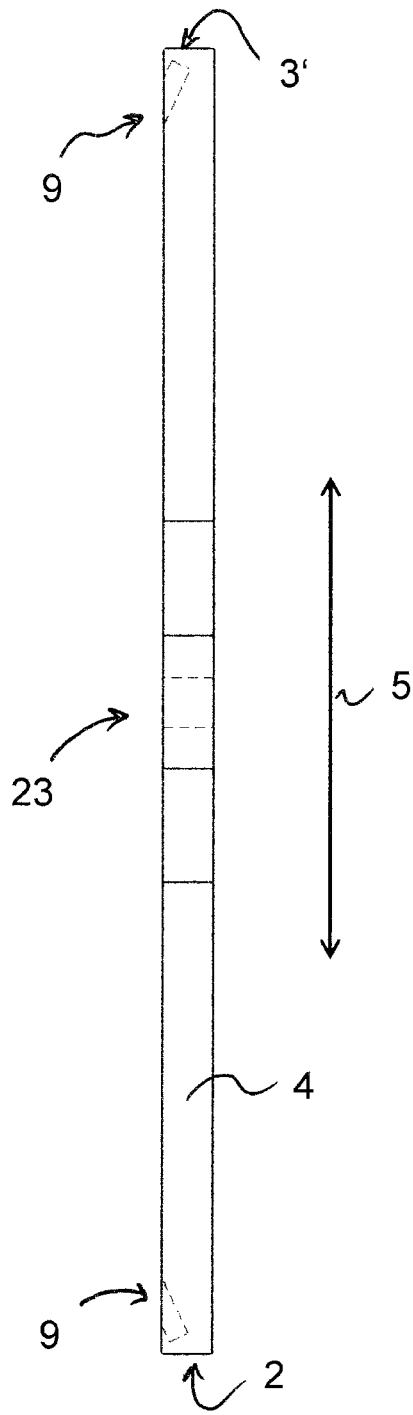
FIG. 27 is a side view of the ultrasonic tool from FIG. 26.
Figure 28:
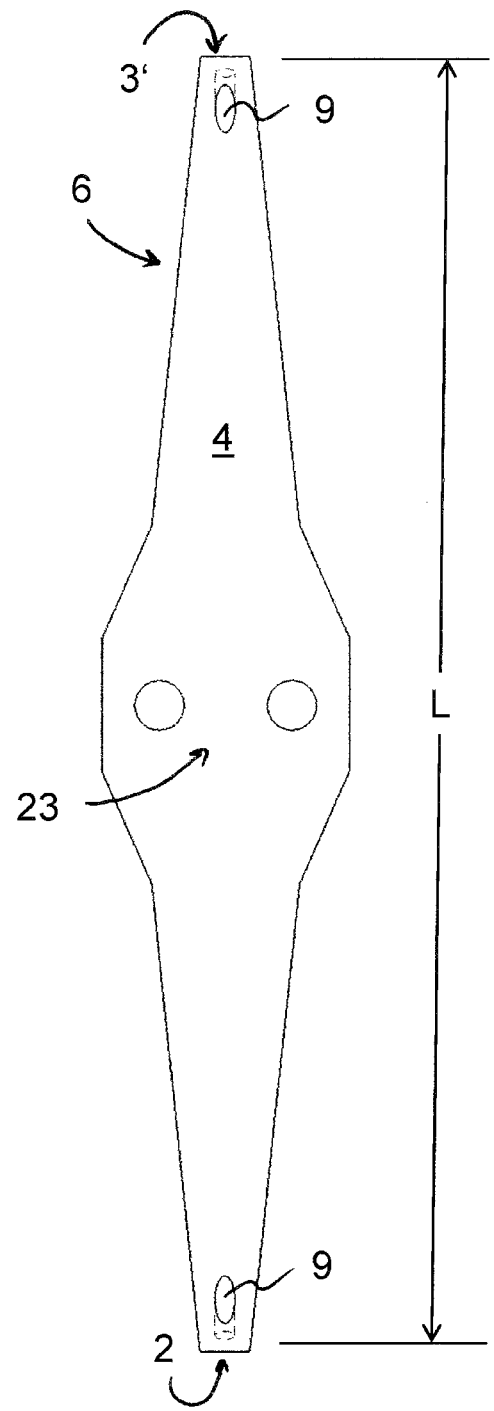
FIG. 28 is a front view of the tool from FIGS. 26 and 27.

According to an eleventh embodiment of the invention in accordance with FIGS. 26 to 28, the ultrasonic tool 1 is symmetrical relative to the longitudinal center plane 8 and additionally is symmetrical relative to a transverse center plane 22. In this regard it is a reversible tool with a central receptacle 23, in which the first end face 2 and in addition the second end face 3' opposite the first end face 2 as well are designed as connection contact surfaces 2, 3'.

In each case, the ultrasonic tool 1 tapers in the direction of the connection contact surfaces 2, 3', thus forming two free end regions 6, each with a recess 9, on the mutually opposite sides. The recesses 9 are arranged at an acute angle to the longitudinal direction 5 of the tool with such a slope that the recess floor 14 faces the adjacent connection contact surface 2, 3' in each case.

Figure 29:
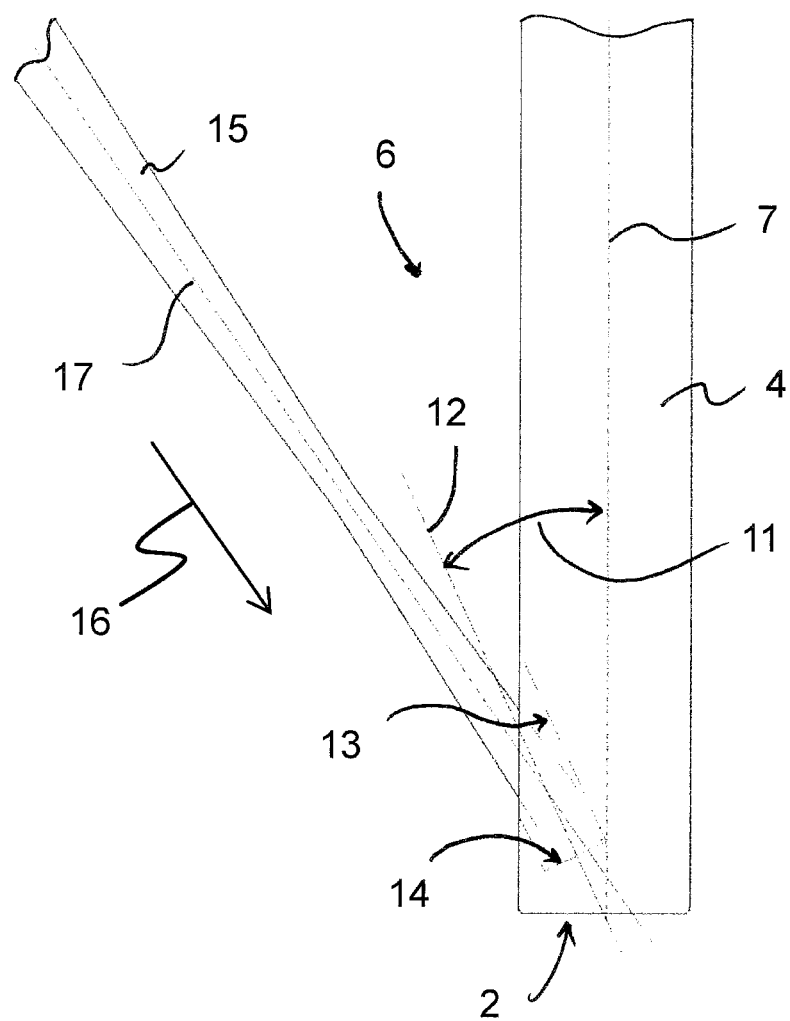
FIG. 29 is an enlarged side view of the end region of the ultrasonic tool from FIGS. 26 to 28 with a laser been directed onto the recess.

The recess lateral surface 13 of each recess 9 is cylindrical, as in the first exemplary embodiment of the invention, and the recess floor 14 is flat and oriented perpendicularly to the longitudinal center axis 12 of the recess 9. FIG. 29 shows that, during operation of the laser generator or the ultrasonic connection device, the divergent laser beam 15 is directed onto the recess 9, and predominantly strikes the recess floor 14. The axis 17 of incidence of the laser beam 15 in this case is oriented with a slope to the longitudinal center axis 12 of the recess 9. In this regard, the laser beam 15 strikes the flat recess floor 14 obliquely.

The geometry of the different recesses 9 is chosen by way of example in each case. The recess geometry is not limited to the embodiments shown. In particular, it is not necessary for a sharp-edged transition to be formed from the recess lateral surface 13 to the recess floor 14 or for the recess 9 to have a regular or symmetrical shape. For example, the recess 9 can be formed in the manner of a half shell or in a drop shape, or be delimited by a freeform surface.

Identical components and component functions are labeled with identical reference symbols.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. An ultrasonic tool comprising:
   a first end face;
   a second end face arranged opposite the first end face; and
   a tool lateral surface connecting the first end face and the second end face,
   wherein the ultrasonic tool is designed to be elongate in a longitudinal direction of the tool,
   wherein at least the first end face is designed as a connection contact surface that is arranged for pressing the ultrasonic tool against a connection component, wherein the ultrasonic tool has an end region having the connection contact surface, which end region extends from the connection contact surface in the longitudinal direction of the tool, at most one third of a length of the ultrasonic tool, toward the opposite end face,
wherein the ultrasonic tool in the end region tapers, at least by sections, relative to a cross-section oriented perpendicularly to the longitudinal direction of the tool toward the connection contact surface, and
wherein a recess is formed at the tool lateral surface in the end region, the recess having;
a first open end;
a recess lateral surface; and
a recess floor forming a second closed end.

2. The ultrasonic tool according to claim 1, wherein the recess extends from the tool lateral surface in the direction of the connection contact surface.

3. The ultrasonic tool according to claim 1, wherein a bounding contour of the recess formed toward the tool lateral surface is shaped in the manner of a circular arc, at least in sections, and/or elliptically, at least in sections, and/or in the manner of a parabola, at least in sections, and/or hyperbolically, at least in sections.

4. The ultrasonic tool according to claim 1, wherein the recess lateral surface of the recess is shaped in the form of a cylinder or a truncated cone, at least in sections.

5. The ultrasonic tool according to claim 1, wherein the recess is designed to be symmetrical, at least in sections, relative to a longitudinal center axis of the recess and/or has a cross-sectional contour that is identical, at least in sections, with respect to a size and/or shape.

6. The ultrasonic tool according to claim 5, wherein the longitudinal center axis of the recess and the longitudinal direction of the tool enclose an acute angle, and/or in that the acute angle is in the range from 15 to 50°.

7. The ultrasonic tool according to claim 1, wherein the recess floor and/or the recess lateral surface of the recess has a surface that diffusely reflects a laser beam, and/or wherein the surface of the recess floor is oriented substantially perpendicularly to the longitudinal center axis of the recess or to the longitudinal direction of the tool, and/or wherein the surface of the recess floor is not oriented perpendicularly to the longitudinal center axis of the recess, and/or wherein the surface at the recess floor is oriented with a slope to the longitudinal center axis of the recess, and/or is formed with a curve, in such a manner that the laser beam incident in the recess is reflected in a direction of the recess lateral surface.

8. The ultrasonic tool according to claim 1, wherein a rounded transition surface is formed between the recess lateral surface and the recess floor.

9. The ultrasonic tool according to claim 1, wherein the recess is oriented symmetrically to a longitudinal center plane of the tool incorporating the longitudinal direction of the tool, and/or in wherein the longitudinal center plane of the tool is implemented as a plane of symmetry of the ultrasonic tool, and/or wherein the ultrasonic tool is designed symmetrically relative to a transverse center plane oriented perpendicularly to the longitudinal direction of the tool and/or the longitudinal center plane of the tool, wherein the second end face is also designed as a connection contact surface.

10. The ultrasonic tool according to claim 1, wherein the recess is produced by electric discharge machining and/or by additive manufacturing processes and/or by laser ablation and/or by primary forming methods and/or by machining, and/or in that a contact contour is provided on the at least one connection contact surface.

11. The ultrasonic tool according to claim 1, wherein the ultrasonic tool is composed of a hard metal or a ceramic or steel.

12. An ultrasonic connection device for ultrasonic welding and/or ultrasonic bonding, the ultrasonic connection device comprising:
an ultrasonic tool comprising:
a first end face;
a second end face arranged opposite the first end face; and
a tool lateral surface connecting the first end face and the second end face,
wherein the ultrasonic tool is designed to be elongate in a longitudinal direction of the tool,
wherein at least the first end face is designed as a connection contact surface that is arranged for pressing the ultrasonic tool against a connection component,
wherein the ultrasonic tool has an end region having the connection contact surface, which end region extends from the connection contact surface in the longitudinal direction of the tool, at most one third of a length of the ultrasonic tool, toward the opposite end face, and
wherein a recess having a recess lateral surface and having a recess floor having a closed end is formed at the tool lateral surface in the end region;
an ultrasonic generator;
a transducer, wherein the ultrasonic generator excites the transducer into oscillations in such a manner and the transducer interacts with the ultrasonic tool in such a manner that the ultrasonic tool is excited into ultrasonic oscillations, or into ultrasonic flexural oscillations; and
a laser generator for providing a laser beam that is directed onto the recess formed at the ultrasonic tool such that the laser beam strikes the ultrasonic tool entirely or mainly inside the recess and such that the laser beam strikes the recess floor of the recess facing the connection contact surface.

13. The ultrasonic connection device according to claim 12, wherein an axis of incidence of the laser beam is oriented with a slope to the longitudinal center axis of the recess.

14. The ultrasonic connection device according to claim 12, wherein the laser beam strikes the recess floor at an angle differing from 90°.

15. The ultrasonic connection device according to claim 12, wherein a wavelength of the laser beam is matched to a material of the ultrasonic tool and/or to a geometry and/or surface finish of the recess lateral surface and/or of the recess floor such that an absorptance of at least 0.3, is achieved.

16. The ultrasonic tool according to claim 1, wherein the ultrasonic tool is composed of tungsten-carbide in a cobalt matrix or boron nitride.

17. The ultrasonic tool according to claim 1, wherein the ultrasonic tool is composed of tungsten carbide in a cobalt matrix.

18. An ultrasonic tool comprising:
a first end face designed as a connection contact surface;
a second end face arranged opposite the first end face;
a tool lateral surface connecting the first end face and the second end face;
a tapered end region, having the connection contact surface, extending from the connection contact surface in a longitudinal direction of the ultrasonic tool; and
a recess formed in the tool lateral surface in the tapered end region, the recess having:

a first open end;

a recess lateral surface; and a recess floor forming a second closed end.

19. The ultrasonic tool according to claim 18, wherein the recess is a single recess enclosed solely by the tool lateral surface.

20. The ultrasonic tool according to claim 18, wherein the recess does not extend into the connection contact surface.

21. The ultrasonic tool according to claim 18, wherein the end region is formed in a wedge shape toward the connection contact surface.

22. An ultrasonic connection device for ultrasonic welding and/or ultrasonic bonding, the ultrasonic connection device comprising:

an ultrasonic tool comprising:

a first end face;

a second end face arranged opposite the first end face; and a tool lateral surface connecting the first end face and the second end face, wherein the ultrasonic tool is designed to be elongate in a longitudinal direction of the tool, wherein at least the first end face is designed as a connection contact surface that is arranged for pressing the ultrasonic tool against a connection component, wherein the ultrasonic tool has an end region having the connection contact surface, which end region extends from the connection contact surface in the longitudinal direction of the tool over 15 mm, but at most one third of a length of the ultrasonic tool, toward the opposite end face, and wherein a recess having a recess lateral surface and having a recess floor having a closed end is formed at the tool lateral surface in the end region; and a laser generator for providing a laser beam that is directed onto the recess such that the laser beam strikes the ultrasonic tool entirely or mainly inside the recess and such that the laser beam strikes the recess floor of the recess facing the connection contact surface.

23. The ultrasonic tool according to claim 1, wherein the recess is solely open into the tool lateral surface.

24. The ultrasonic tool according to claim 1, wherein the recess floor is oriented perpendicularly to a longitudinal center axis of the recess.

25. The ultrasonic tool according to claim 1, wherein the recess has a single opening comprising the first open end.

26. The ultrasonic tool according to claim 1, wherein the recess has a single opening, comprising the first open end, enclosed solely the tool lateral surface.

* * * * *